Dec. 6, 1960   H. L. BOWDITCH   2,963,633
POSITIONING MOTOR
Filed May 26, 1958   2 Sheets-Sheet 1
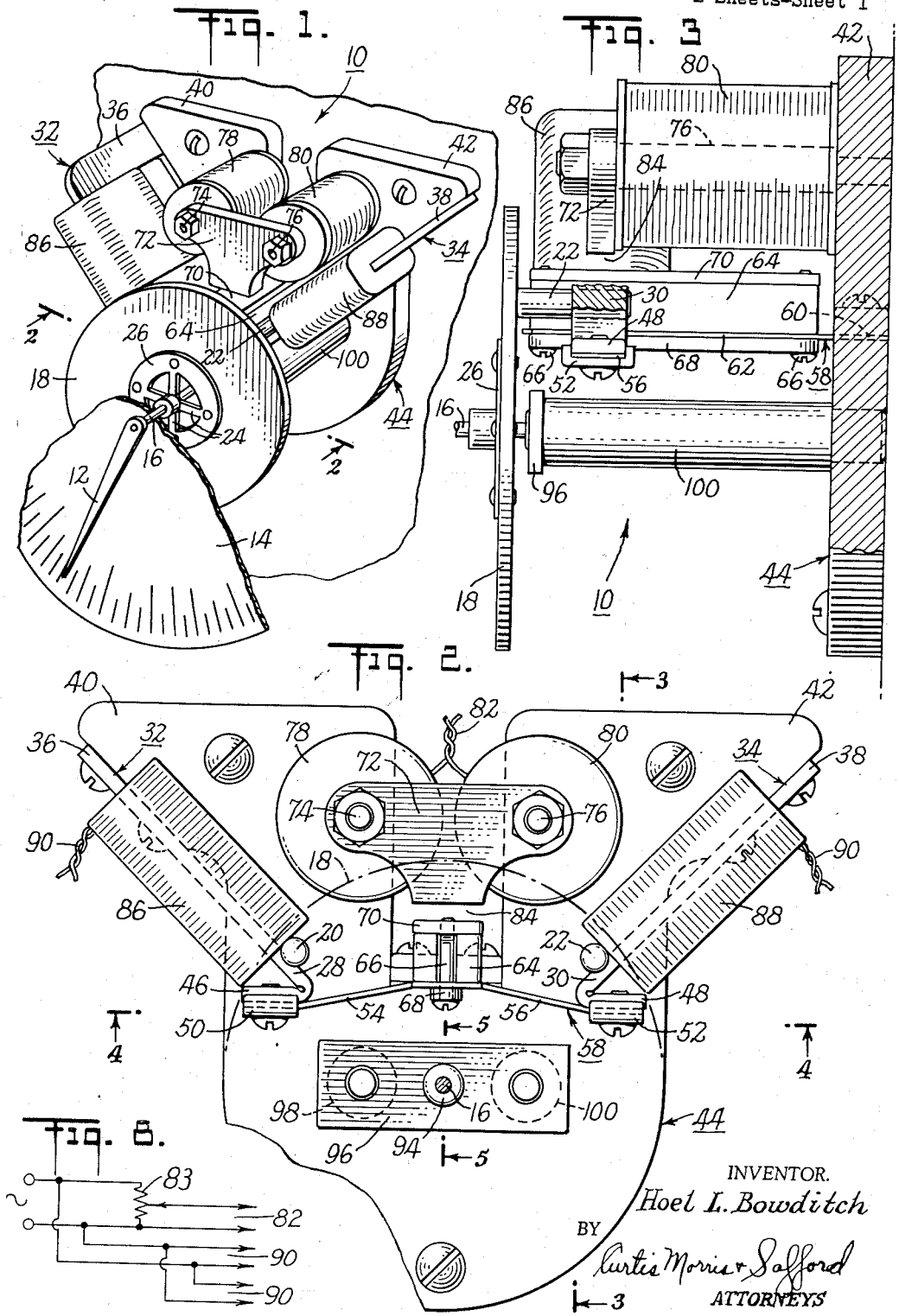
INVENTOR.
Hoel L. Bowditch
BY
Curtis, Morris & Safford
ATTORNEYS Dec. 6, 1960
H. L. BOWDITCH
2,963,633
POSITIONING MOTOR
Filed May 26, 1958
2 Sheets-Sheet 2
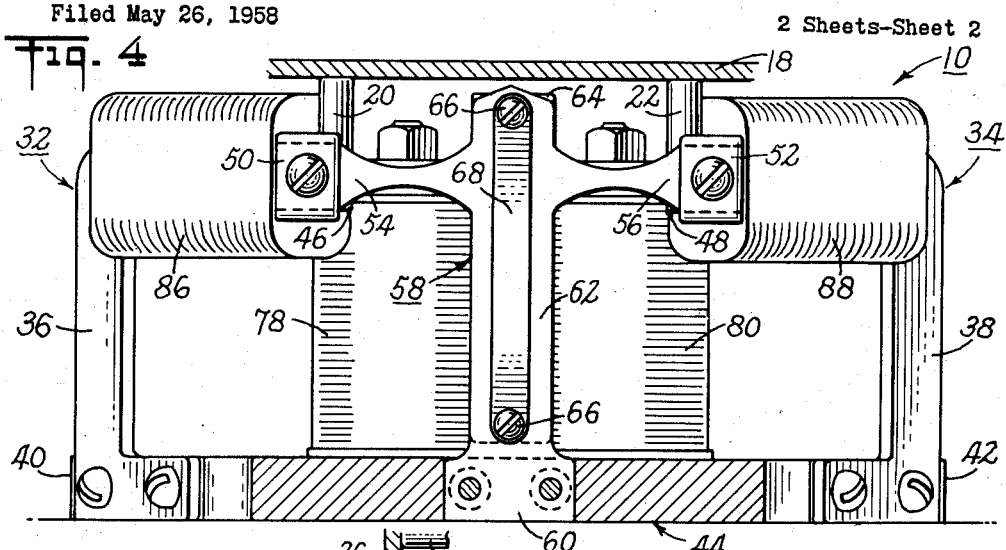
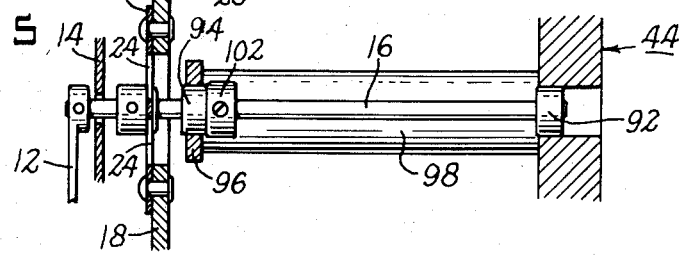
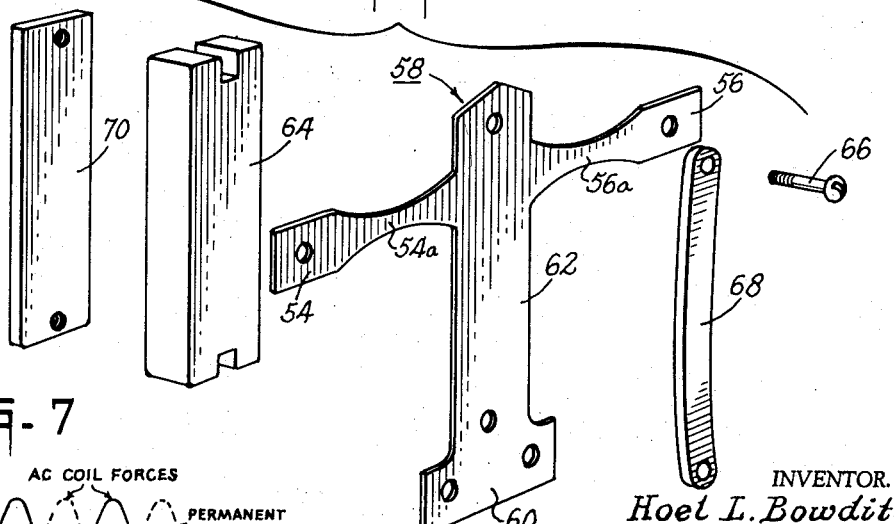
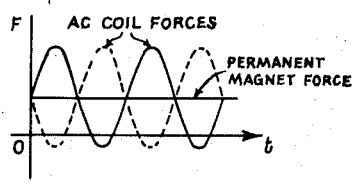
INVENTOR.
Hoel L. Bowditch
BY
Curtis, Morris & Safford
ATTORNEYS United States Patent Office 2,963,633
Patented Dec. 6, 1960

2,963,633

POSITIONING MOTOR

Hoel L. Bowditch, Foxboro, Mass., assignor to The Foxboro Company, Foxboro, Mass., a corporation of Massachusetts Filed May 26, 1958, Ser. No. 737,663

19 Claims. (Cl. 318—37)

This invention relates to electrically-operated motors. More particularly, this invention relates to such motors that are especially adapted to rapidly position a movable device with high precision and stability.

In order to record or control the operation of many industrial processes, such as those involving the flow of liquids and the like, it frequently is necessary to accurately position one or more of a variety of movable devices, for example the pen of a recording instrument, the stem of a valve controlling the flow rate of a liquid, etc. For such applications, it is essential that the positioning motor be capable of moving the device to be positioned at speeds variable over a wide range, yet the motor also must be capable of stopping rapidly and smoothly at the precise final setting desired. Also, the motor should especially be adapted for use in a servo-type rebalancing system, e.g. a system wherein the motor is controlled by an error signal representative of the difference between the actual positioning of the driven device and the desired positioning thereof. Moreover, with the growth in usage of electrical control systems, it is important to provide such a motor that is operable by an electric control signal, as distinct for example from the pneumatic control signals used for many years in the past.

Although many attempts have been made to provide positioning motors capable of giving the required performance, no fully practical construction has heretofore been proposed. Generally speaking, prior electrical positioning motors have been unduly complex and inefficient, and have been expensive to manufacture. Furthermore, prior motors commonly have had considerable inertia so that, particularly when the motor was operated at high speed, there was a tendency to overshoot the final position thus leading to instability and loss of precision. And prior motors, such as those employing gear trains and similar mechanisms, have been particularly unsatisfactory in that they rapidly wear out under the conditions of intermittent high-speed operation encountered in industrial control applications.

To solve this problem and to avoid the difficulties encountered with prior positioning motors, applicant has provided a variable-speed electric motor that is simple in construction, capable of high-speed operation, and which nevertheless has low inertia. In an embodiment of this invention, to be described in more detail hereinbelow, a motor is provided which operates with a "stepping" action obtained by oscillating a pair of drive elements towards and away from each other, and alternately clamping these elements to a movable drive member in synchronism with the oscillating movement. The alternate clamping of the drive elements is produced by respective alternating magnetic fields combined with a steady biasing magnetic field (developed in this particular embodiment by a permanent magnet), thus permitting the motor to be energized from conventional 60 cycle alternating-current power mains.

With this motor arrangement, the movable drive member is shifted in incremental steps at a speed proportional to the frequency and amplitude of the oscillation of the two drive elements. Since the motor comes to a complete stop between each step, there is very little inertial effect, and the final positioning is very precise because the incremental steps may be made quite small. Moreover, the speed of the motor can be varied simply by altering the amplitude of oscillation of the two drive elements.

Motors which operate with a stepping action have, of course, been proposed before. For example, there have been a variety of solenoid-operated ratchet devices available in the past, and it also has been suggested that the well-known magneto-strictive effect be used to produce a stepping action, as in U.S. Patent No. 2,506,141 to Drouin. Although such prior devices have found utility in certain limited applications, they have not been capable of meeting the requirements for a positioning motor that is broadly useful in industrial instrumentation and process control systems.

Accordingly, it is an object of this invention to provide a positioning motor that is superior to such motors provided heretofore. It is a further object of this invention to provide such a motor having a wide speed range combined with low inertial effects. It is a still further object of this invention to provide a motor that is energizable by standard alternating-current power, e.g. 60 c.p.s., and that is controllable by an electrical control signal. An additional object of this invention is to provide such a motor the direction of movement of which will reverse when the phase of the control signal is reversed. Another object of this invention is to provide such a motor that is adapted to produce rotary motion. Yet another object of this invention is to provide such a motor that is economical to manufacture and efficient and reliable in operation. Other objects, aspects and advantages of the invention will be in part pointed out in, and in part apparent from, the following description considered together with the accompanying drawings, in which:

Figure 1 is a perspective view of a motor constructed in accordance with the present invention and used to position an indicating pointer about a dial;

Figure 2 is a plan view of the motor, taken along line 2—2 of Figure 1, showing the structure beneath the rotatable drive disk;

Figure 3 is a vertical section of the motor taken along line 3—3 of Figure 2;

Figure 4 is a vertical section of the motor taken along line 4—4 of Figure 2;

Figure 5 is a detail vertical section taken along line 5—5 of Figure 2, and particularly showing the shaft structure on which the rotatable drive disk is mounted;

Figure 6 is an exploded perspective view showing the detailed construction of the T-shaped flexure and permanent magnet assembly;

Figure 7 is a diagram showing the magnetic forces acting on the drive disk; and

Figure 8 is a schematic diagram showing an electrical energizing circuit for the motor.

Referring now to Figure 1 of the drawings, there is shown in cutaway perspective a drive motor 10 constructed in accordance with the present invention and arranged to control the positioning of a pointer 12 around a dial 14. The pointer is mounted on a shaft 16 which is rotated by a drive member in the form of a flat disk 18 made of soft magnetic material, e.g. cold rolled steel.

Referring also to Figures 2 through 4, immediately beneath the disk 18 is a pair of drive elements consisting of short cylindrical rods 20 and 22, formed of soft magnetic material, and having flat ends engageable with the flat underside of the disk. The disk is supplied with a steady magnetic flux, as will be described in more detail, which tends to produce an attractive force between the disk and the rods. Furthermore, this steady magnetic flux is supplemented by an alternating magnetic flux produced in each rod by respective electric currents of opposite electrical phase, with the result that the rods are alternately locked to the disk on successive half-cycles of the A.-C. energizing signal. To facilitate this locking action, the disk is secured to the shaft 16 by an omnidirectional flexible mounting comprising four radial flexure strips 24 formed of beryllium copper, i.e. a nonmagnetic spring material, which extend out to a coaxial ring 26 screwed to the disk. Thus, the disk tips slightly with respect to its rotational axis in response to the alternating magnetic forces produced between the rods and the disk, so as to assure that the disk is alternately clamped to the rods in a positive manner in any rotational position of the disk.

The drive rods 20 and 22 are secured to respective arms 28 and 30 of a pair of generally L-shaped flexure supports 32 and 34 formed of soft magnetic material such as cold rolled steel. These supports are arranged to permit a back-and-forth oscillating movement of the rods in a plane parallel to the plane of the disk 18. The upstanding legs 36 and 38 of these flexure supports are bolted to the flared-out feet 40 and 42 of a generally U-shaped base plate 44, also made of soft magnetic material, and the flexure support arms 28 and 30 are aligned radially with respect to the disk so that the oscillating movement of the rods 20 and 22 will be substantially tangential, i.e. essentially perpendicular to radial lines through the shaft 16 as viewed in Figure 2.

The tips 46 and 48 of the flexure supports 32 and 34 are turned outwardly at an acute angle and are secured, by a pair of brass screw-clamp members 50 and 52, to the cross-arm portions 54 and 56 of a thin T-shaped flexure strip generally indicated at 58 and formed of hard rolled beryllium-copper (see also Figure 6). The bottom 60 of this strip is bolted to the base plate 44 to permit the strip to flex back and forth about the lower end of its central leg 62, i.e. in a direction perpendicular to an imaginary line joining the rods 20 and 22. Secured to one side of the central leg 62 is a permanent magnet 64 which forms part of the motive means for flexing the strip 58. This magnet is held in place by screws 66 which extend through a copper spring member 68 and thread into a brass back-up spacer plate 70. The spring member 68 is formed with a slight bow which provides a self-locking action to hold the screws in place.

As particularly shown in Figure 2, the upper end of the permanent magnet 64 is positioned adjacent a pole-piece 72 which is mounted on top of a pair of magnetic cores 74 and 76 extending down to the base plate 44. Secured in place around these cores are respective control windings 78 and 80 which are energized in phase through input leads 82. These leads are connected to a source of alternating current (see Figure 8) the amplitude of which may be controlled by means of a potentiometer 83. Other types of current sources may of course be used, such as the output of an amplifier forming part of an industrial recording system, which feeds to the control windings an alternating-current sine-wave control signal of adjustable amplitude and reversible phase, e.g. having a frequency of 60 c.p.s. The winding 78 and 80 produce alternating flux which extends out into the air-gap 84 between the pole-piece 72 and the upper end of the permanent magnet 64.

The steady flux produced by the permanent magnet 64 across the air-gap 84 tends to draw the magnet closer to the pole-piece 72, while the alternating flux produced by the control windings 78 and 80 alternately aids and opposes the steady flux. Thus the magnet is continually attracted to the pole-piece 72 with a force that varies sinusoidally at the same frequency as, and with an amplitude proportional to, the control signal fed to the control windings. The permanent magnet also is subjected to the spring-return force of the T-shaped strip 58 and the flexure supports 32 and 34, and the combination of this spring force and the varying magnetic force causes the magnet to vibrate back and forth, towards and away from the pole-piece 72, at the frequency of the control signal.

As the permanent magnet 64 moves towards the pole-piece 72, it carries with it the cross-arm portions 54 and 56 of the T-shaped strip 58. These cross-arm portions thereupon flex about the magnet, since they are in effect articulated at the region of joinder with the magnet. It has been found to be advantageous to form these cross-arm portions with relatively thin central regions 54a and 56a, as shown particularly in Figure 6, in order to assure that a substantial part of the flexing action takes place in those central regions and thus reduce the chance of breakage under the stress of large-amplitude vibrations.

As the cross-arm portions 54 and 56 are flexed towards the pole-piece 72 during the time of increasing magnetic attractive force on the permanent magnet 64, the tips 46 and 48 of the flexure supports 32 and 34 are correspondingly pulled towards each other so as to shift the rods 20 and 22 in a pivotal movement about the axes of the flexure support legs 36 and 38. However, as the magnetic attractive force applied to the magnet 64 decreases during the subsequent part of the control signal cycle, the rods shift back to their normal position (as shown) due to the spring-return action of the strip 58 and the flexure supports 32 and 34.

Consequently, the vibrating motion of the permanent magnet 64 serves to oscillate the rods 20 and 22 towards and away from each other, with the result that these rods are shifted back and forth essentially in a tangential direction with respect to the disk 18. Furthermore, the rods always move in opposite directions relative to the direction of movement of the disk, i.e. the rods are driven in opposite mechanical phase sense. The lineal distance that the rods traverse in this oscillating movement is determined by the amplitude of the control signal fed to the windings 78 and 80.

As shown particularly in Figure 3, one end of the permanent magnet 64 is closely adjacent the underside of the disk 18, and so supplies a steady magnetic flux to the disk. A major portion of this steady flux passes from the disk to the rods 20 and 22, and returns to the other end of the permanent magnet through magnetic circuits formed by the flexure supports 32 and 34 and the base plate 44. This steady flux, as mentioned hereinabove, tends to produce a force of attraction between the disk and the rods.

To achieve alternate clamping action between the disk 18 and the rods 20 and 22, each of the flexure support arms 28 and 30 is provided with a respective activating coil 86 and 88 adapted to produce alternating flux through the corresponding rods. These coils are energized by the supply source (see Figure 8) of constant-amplitude sine-wave alternating current. The coils 86 and 88 therefore are energized by current which has the same frequency as, and is synchronized with, the sine-wave control signal fed to the control windings 78 and 80. Furthermore, the activating coils 86 and 88 are connected to this source of alternating current by circuit means, diagrammatically indicated at 90, arranged in such a manner that the coils are energized in opposite electrical phase sense with respect to the steady flux produced by the permanent magnet, i.e. the direction of the flux produced at any instant by one coil through its corresponding rod 20 or 22 will be opposite to the direction of the flux produced at that instant by the other coil through the other rod.

Consequently, during any one half-cycle of the supply source current, the flux developed by one of the activating coils 86 or 88 will aid the flux produced by the permanent magnet 64 through the corresponding one of the above-mentioned magnetic circuits, while the flux developed by the other activating coil will oppose the permanent magnet flux through the other magnetic circuit. During the succeeding half-cycle of the supply current, of course, these conditions will be reversed.

In order to obtain a highly effective alternate locking of the disk 18 to the rods 20 and 22, the activating coils 86 and 88 are arranged to produce flux of sufficiently great intensity that, during a small part of each cycle, the attractive force of the permanent magnet flux is more than overcome. This is indicated diagrammatically in Figure 7, wherein the forces on the disk 18, at the regions of engagement with the rods 20 and 22, are plotted for two cycles of the supply current. In this diagram, the constant force of attraction produced by the steady flux from the permanent magnet 64 is represented by a horizontal line above the zero force axis, while the variation in force of attraction due to the A.-C. flux produced by the coils 86 and 88 is represented by the solid and dotted sine-wave curves respectively. It will be apparent that during any one half-cycle the A.-C. flux produced by one coil augments the permanent magnet force and thus tends to lock the corresponding rod more tightly to the disk, while the A.-C. flux produced by the other coil opposes the permanent magnet force and thus diminishes the force of attraction between the other rod and the disk. Also, the A.-C. flux amplitude is sufficiently large that, during a small part of the half-cycle when it opposes the permanent magnet flux, the A.-C. flux produces a small repelling force tending to move the disk away from the corresponding rod, as indicated by the portions of the sine-wave curves below the zero-force axis. Thus, during a part of each half-cycle, one of the rods is completely free of the disk thereby assuring minimum frictional drag.

During the time period that the flux through the rods 20 and 22 varies over one complete cycle, the permanent magnet 64 will vibrate back and forth through one complete cycle of its mechanical motion in synchronism therewith. For example, in one mode of operation in which the disk 18 is driven in a clockwise direction (referring to Figures 1 and 2), while the magnet is moving towards the pole piece 72 the A.-C. activating coil flux through the left-hand rod 20 will aid the permanent magnet biasing flux, with the result that during this part of the cycle the rod 20 is locked to the disk 18. Correspondingly, the A.-C. activating coil flux through the right-hand rod 22 will oppose the biasing flux so that the rod 22 will be free to move relative to the disk. Therefore, as the first rod 20 moves to the right due to the pulling action of the cross-arm portion 54, it will rotate the disk clockwise about the shaft 16, while the other rod 22 moves freely to the left under the rotating disk. During the next half-cycle, as the permanent magnet 64 moves away from the pole piece 72, the right-hand rod 22 will be locked to the disk while the left-hand rod 20 will be free to move relative thereto. Accordingly, the disk again will be rotated clockwise about the shaft 16 as the rod 22 moves to the right due to the spring-return action of the flexure support 34.

Consequently, it will be apparent that the disk 18 will continually rotate in periodic incremental steps, with each step corresponding to one half-cycle of the control signal fed to the control windings 78 and 80. The size of each step, and thus the speed of rotation, is determined by the amplitude of vibration of the permanent magnet 64, and this amplitude in turn is variable in accordance with the magnitude of the control signal fed to the control windings. If the phase of the control signal is reversed, the motion of the disk also will be reversed, i.e. to counterclockwise rotation about the shaft 16. When the control signal is zero, of course, there is no motion of the disk which is held clamped in place. If the power to the motor is cut off, accidentally or otherwise, the disk will be magnetically locked to both of the rods 20 and 22, due to the permanent magnet flux, so that there will be no slippage of the motor in this condition.

As shown in Figure 5, the shaft 16 extends down to the base plate 44, and is provided at its remote end with thrust bearing means, generally indicated at 92, secured within an aperture in the base plate. The shaft also is provided with side bearing means 94 secured to a frame member 96 which is mounted on the base plate by a pair of brass studs 98 and 100 (see also Figure 2). A collar 102 is screwed to the shaft 16 adjacent the latter bearing means 94 in order to assure that the shaft is retained in position.

Although a preferred embodiment of the invention has been set forth in detail, it is desired to emphasize that this is not intended to be exhaustive or necessarily limitative; on the contrary, the showing herein is for the purpose of illustrating the invention and thus to enable others skilled in the art to adapt the invention in such ways as meet the requirements of particular applications, it being understood that various modifications may be made without departing from the scope of the invention as limited by the prior art.

I claim:

1. Motor apparatus comprising, in combination, a drive member, first and second drive means engageable with said member at spaced points thereon for causing incremental relative movement between said member and said drive means, a support structure mounting at least one of said drive means for oscillating motion generally in line with said relative movement, motive means for producing said oscillating motion, first and second coils magnetically associated with said first and second drive means respectively for engaging said drive means with said drive member, circuit means for energizing said first and second coils from a source of alternating current synchronized with the movement of said motive means, said circuit means being arranged to energize said coils in opposite electrical phase sense, and magnetic means coupled to said coil means for producing bias flux in said drive means, whereby said drive means are engaged with said drive member alternately and in synchronism with the operation of said motive means so as to produce said relative movement.

2. Motor apparatus comprising, in combination, a drive member, shaft means mounting said drive member for rotary motion, first and second drive means engageable with said drive member at respective points thereon angularly spaced apart with respect to said shaft means, a support structure mounting at least one of said drive means for oscillating movement in a direction having a component that is perpendicular to a radius line drawn through said shaft means, motive means for oscillating said one drive means, first and second magnetic means associated with said first and second drive means respectively for developing forces for clamping said drive means to said drive member, and circuit means for activating said first and second magnetic means alternately and in synchronism with the oscillation of said one drive means, whereby said drive member is alternately clamped to said drive means respectively so as to cause said drive member to be rotated about said shaft means in incremental steps in accordance with the amplitude of oscillation of said one drive means.

3. Motor apparatus comprising, in combination, a disk-shaped drive member formed of magnetic material, shaft means secured to the center of said drive member and mounting said drive member for rotary motion, first and second magnetic drive elements engageable with one side of said drive member at respective points thereon angularly spaced apart with respect to said shaft means, flexible support structure means mounting said drive elements for oscillating movement with respect to said drive member, said support structure means being arranged to permit said drive elements to move in directions that are perpendicular to respective radius lines drawn from said drive elements through said shaft means, motive means for oscillating said drive elements, first and second flux-producing means magnetically associated with said first and second drive elements respectively for developing magnetic lines of force between said drive elements and said drive member, and circuit means for activating said first and second flux-producing means alternately and in synchronism with the oscillation of said drive elements, whereby said drive member is alternately clamped to said drive elements respectively so as to rotate said drive member about said shaft means in incremental steps in accordance with the amplitude of oscillation of said drive elements.

4. Motor apparatus comprising, in combination, a base plate formed of magnetic material, a drive member formed of magnetic material and mounted on said base plate for movement with respect thereto, first and second drive elements formed of magnetic material and engageable with said drive member at spaced points thereon, a support structure secured to said base plate and mounting at least one of said drive elements for oscillating movement relative to said drive member, a T-shaped flexure strip having the ends of its cross-arm portions secured to said drive elements respectively, the central leg of said flexure being secured at its lower end to said base plate and extending between said base plate and said drive member, an elongated permanent magnet secured to the central leg of said flexure strip with its ends adjacent said drive member and said base plate respectively, control winding means magnetically coupled to said permanent magnet and energizable by a control signal of alternating current to vibrate said permanent magnet back and forth in a direction transverse to said cross-arm portions, first and second activating coil means carried along with said first and second drive elements respectively for producing flux between said drive elements and said drive member, and circuit means for energizing said first and second coil means from a source of alternating current synchronized with said control signal, said circuit means being arranged to energize said coil means in opposite electrical phase sense with respect to the flux produced between said drive member and said drive elements by said permanent magnet, whereby said drive elements are engaged with said drive member alternately and in synchronism with the oscillation of said one drive element.

5. Motor apparatus comprising, in combination, a drive member, first and second spaced drive elements engageable with said member, a support structure mounting said drive elements for relative movement towards and away from each other, connection means secured to and extending between said drive elements, said connection means including first and second portions articulated at a region intermediate said drive elements, motive means for shifting said connection means back and forth in a direction transverse to an imaginary line joining said drive elements so as to produce said relative movement therebetween, and activating means for alternately engaging said drive elements with said drive member in synchronism with the operation of said motive means, whereby to produce relative movement between said drive member and said support structure.

6. Motor apparatus comprising, in combination, a drive member, first and second spaced drive elements engageable with said member, a support structure mounting said drive elements for relative movement towards and away from each other, connection means securing said drive elements together, said connection means including first and second portions joined together end-to-end in such a manner as to permit relative angular movement between said portions, motive means for shifting said connection portions back and forth in a direction transverse to an imaginary line joining said drive elements to change the angular relationship between said portions and thereby to produce said relative movement between said drive elements, and activating means for alternately engaging said drive elements with said drive member in synchronism with the operation of said motive means, whereby to produce relative movement between said drive member and said support structure.

7. Motor apparatus comprising, in combination, a drive member, first and second spaced drive elements engageable with said member, a support structure mounting said drive elements for relative movement towards and away from each other, articulated connection means securing said drive elements together, said connection means including first and second elongated parts hingedly joined together in a region between said drive elements, motive means for shifting said connection means back and forth in a direction transverse to an imaginary line joining said drive elements so as to move said drive elements relative to one another, and activating means for alternately engaging said drive elements with said drive member in synchronism with the operation of said motive means, whereby to produce relative movement between said drive member and said support structure.

8. Motor apparatus comprising, in combination, a drive member, first and second spaced drive elements engageable with said member, a support structure mounting said drive elements for relative movement towards and away from each other, a flexible strip extending between and securing said drive elements together, motive means for shifting a portion of said strip back and forth in a direction transverse to an imaginary line joining said drive elements so as to produce said relative movement therebetween, and activating means for alternately engaging said drive elements with said drive member in synchronism with the operation of said motive means, whereby to produce relative movement between said drive member and said support structure.

9. Motor apparatus comprising, in combination, a drive member, first and second spaced drive elements engageable with said member, a support structure mounting said drive elements for relative movement towards and away from each other, connection means securing said drive elements together, said connection means including first and second portions articulated at an intermediate region, a vibrating device engageable with said connection means and operable to shift said connection means back and forth in a direction transverse to an imaginary line joining said drive elements, and cyclically energized magnetic means for alternately engaging said drive elements with said drive member in synchronism with the operation of said vibrating device, whereby to produce relative movement between said drive member and said support structure.

10. Motor apparatus comprising, in combination, a drive member, first and second magnetically-operated clamp means engageable with said drive member at spaced points thereon, a support structure for mounting said drive member and said clamp means for relative traversing movement, said support structure including means to permit a slight relative shifting periodically between said drive member and said clamp means in a direction transverse to said traversing movement so as to permit obtaining a tight mechanical engagement therebetween, first and second activating coil means magnetically associated with said first and second clamp means respectively for producing clamping forces, electric circuit means for energizing said first and second coil means from a source of alternating current, magnetic means for producing bias flux through said clamp means, said electric circuit means being arranged to energize said first and second coil means in opposite electrical phase sense with respect to the bias flux produced by said magnetic means, whereby said clamp means are engaged with said drive member alternately on successive half-cycles of said alternating current, and motive means synchronized with said alternating current for periodically traversing said drive member in a step-wise movement relative to said clamp means.

11. Apparatus as claimed in claim 1, wherein said first and second activating coil means are carried along with said first and second drive means respectively.

12. Apparatus as claimed in claim 1, wherein said support structure comprises first and second movable support members each carrying one of said drive means, whereby both of said drive means are movable relative to said drive member.

13. Apparatus as claimed in claim 12, wherein said first and second activating coil means are wound around said first and second support members respectively.

14. Apparatus as claimed in claim 12, including a base plate formed of magnetic material, said first and second support members being mounted on said base plate, said magnetic means being coupled between said base plate and said drive member for producing said bias flux and to provide a return path for the alternating flux produced by said coil means.

15. Apparatus as claimed in claim 1, wherein said magnetic means comprises a permanent magnet.

16. Apparatus as claimed in claim 15, wherein said permanent magnet forms part of said motive means for oscillating said drive means.

17. Apparatus as claimed in claim 1, wherein said circuit means includes means for energizing said activating coils with sine-wave alternating current.

18. Apparatus as claimed in claim 1, wherein said motive means comprises an electrically-operated motor device for periodically urging said one drive means in one direction, said motive means further including spring means urging said one drive means in the opposite direction, whereby to produce said oscillating motion.

19. Apparatus as claimed in claim 10, wherein said first and second coil means are energized by a current of amplitude sufficient to overcome the clamping force produced by said bias flux during a small part of each cycle of alternating current, whereby said first and second clamp means are alternately repelled from and tightly engaged with said drive member.

References Cited in the file of this patent
UNITED STATES PATENTS

| | | |
|---|---|---|
| 1,396,337 | McDonald | Nov. 8, 1921 |
| 2,646,518 | Thompson | July 21, 1953 |